(12) United States Patent
Xu et al.

(10) Patent No.: US 11,275,865 B2
(45) Date of Patent: Mar. 15, 2022

(54) PRIVACY FRIENDLY DECENTRALIZED LEDGER BASED IDENTITY MANAGEMENT SYSTEM AND METHODS

(71) Applicant: Conduent Business Services, LLC, Florham Park, NJ (US)

(72) Inventors: Lei Xu, Cary, NC (US); Isaac Manny Markus Serfaty, Morrisville, NC (US); Nikhil Nayab, Princeton JCT, NJ (US)

(73) Assignee: Conduent Business Services, LLC, Florham Park, NJ (US)

( * ) Notice: Subject to any disclaimer, the term of this patent is extended or adjusted under 35 U.S.C. 154(b) by 270 days.

(21) Appl. No.: 16/550,140

(22) Filed: Aug. 23, 2019

(65) Prior Publication Data
US 2021/0056227 A1 Feb. 25, 2021

(51) Int. Cl.
| | |
|---|---|
| G06F 21/62 | (2013.01) |
| G06F 16/27 | (2019.01) |
| G06F 21/60 | (2013.01) |
| H04L 9/32 | (2006.01) |
| H04L 9/30 | (2006.01) |

(52) U.S. Cl.
CPC .......... G06F 21/6245 (2013.01); G06F 16/27 (2019.01); G06F 21/602 (2013.01); H04L 9/3073 (2013.01); H04L 9/3221 (2013.01)

(58) Field of Classification Search
CPC .... G06F 21/6245; G06F 21/602; G06F 16/27; H04L 9/3073; H04L 9/3221
See application file for complete search history.

(56) References Cited

U.S. PATENT DOCUMENTS

| | | | |
|---|---|---|---|
| 9,635,000 B1 | 4/2017 | Muftic | |
| 9,749,140 B2 | 8/2017 | Oberhauser et al. | |
| 9,992,022 B1 | 6/2018 | Chapman et al. | |
| 10,121,143 B1 | 11/2018 | Madisetti et al. | |
| 10,361,866 B1 * | 7/2019 | McGregor | H04L 9/3239 |
| 10,396,985 B1 * | 8/2019 | Nagelberg | H04L 9/0866 |

(Continued)

FOREIGN PATENT DOCUMENTS

| | | |
|---|---|---|
| WO | 2017066002 A1 | 4/2017 |
| WO | 2018039374 A1 | 3/2018 |

OTHER PUBLICATIONS

Ben-Sasson et al. "SNARKs for C: Verifying program executions succinctly and in zero knowledge." In Advances in Cryptology—CRYPTO 2013, Annual Cryptology Conference, pp. 90-108. Oct. 7, 2013. Springer, Berlin, Heidelberg. (53 pages).

(Continued)

*Primary Examiner* — Saleh Najjar
*Assistant Examiner* — Devin E Almeida
(74) *Attorney, Agent, or Firm* — Ortiz & Lopez, PLLC; Luis M. Ortiz; Kermit D. Lopez (57) ABSTRACT

Systems and methods providing user privacy in association with decentralized ledger technology are disclosed. Improved methods and systems for access control are disclosed wherein an access request can be received at the distributed ledger to fetch a data file without disclosing requester identity, that can verify the access request at the decentralized ledger as a legitimate request or as a malicious/faulty request, and can assist a user of a legitimate request to access the data and deny access to malicious/faulty requests that are compatible with a decentralized ledger environment.

19 Claims, 8 Drawing Sheets

(56) References Cited

U.S. PATENT DOCUMENTS

| | | | |
|---|---|---|---|
| 10,491,404 B1* | 11/2019 | Yamamoto | H04L 9/3247 |
| 2008/0134311 A1 | 6/2008 | Medvinsky et al. | |
| 2013/0117832 A1 | 5/2013 | Gandhi et al. | |
| 2017/0085562 A1* | 3/2017 | Schultz | H04L 63/0861 |
| 2020/0007333 A1* | 1/2020 | Young | H04L 63/0861 |

OTHER PUBLICATIONS

Ben-Sasson et al. "Succinct Non-Interactive Zero Knowledge for a von Neumann Architecture." Proceedings of the 23rd USENIX Security Symposium, Aug. 20-22, 2014, San Diego, California, USENIX Association, pp. 781-796. (17 pages).

* cited by examiner

PRIVACY FRIENDLY DECENTRALIZED LEDGER BASED IDENTITY MANAGEMENT SYSTEM AND METHODS

TECHNICAL FIELD

The embodiments are generally related to decentralized ledgers. Embodiments are also generally related to preserving privacy of parties in association with requests for access to decentralized ledger based data. More particularly, embodiments are related to systems and method for maintaining party identity in association with decentralized ledger based data via a decentralized ledger based identity management system including user privacy controls.

BACKGROUND

Identity management is the foundation of many other applications. As more applications are built on top of decentralized ledger, it is necessary to develop a compatible identity management system. Because of the nature of decentralization, privacy becomes a big concern, i.e., the user cannot safely disclose his/her identity information on the decentralized ledger. The proposed invention proposed a framework together with concrete building components to solve this problem.

A decentralized ledger is an electronic data structure that is maintained by multiple participants, without relying on any centralized party, and various applications can be developed on top of it. This relates to what is commonly referred to as "Blockchain" technology. Decentralized ledgers have various applications related to and requiring data processing and storage. The decentralization feature, however, raises several security concerns since many established security and user privacy protection mechanisms are not compatible with a decentralized environment. As many users and applications need to interact with data, it is important to provide privacy management and control mechanisms that are fully compatible with this decentralized ledger environment while preserving identification privacy for its users.

Identity management is the foundation of many applications. In the decentralized environment, there is a lack of centralized, trusted party to manage all the identity management activities, and the most common operation of identity claim verification has to be done in a decentralized manner. This brings a big concern on privacy, because if all identity related information is stored in plain text, every participant of the decentralized application can learn the information. On the other hand, if identity information is protected using ordinary encryption, it will prevent the participants from processing it. Therefore, there is an urgent need to develop a privacy friendly decentralized ledger based identity management system.

What is needed are improved methods and systems for party identification and access control wherein an access request can be received at the distributed ledger to fetch a data file without disclosing requester identity.

SUMMARY OF EMBODIMENTS

The following summary is provided to facilitate an understanding of some of the innovative features unique to the embodiments disclosed and is not intended to be a full description. A full appreciation of the various aspects of the embodiments can be gained by taking the entire specification, claims, drawings, and abstract as a whole.

It is, therefore, one aspect of the disclosed embodiments to provide methods and systems that achieve user identity privacy within decentralized ledger technology. It is a feature of the embodiments of the present invention to provide decentralized ledger based identity management system.

It is also a feature of the embodiments to provide a framework of identity management on decentralized ledger that an manage identities in a privacy preserving way. It is a feature that an identity management system can supports all common identity management functions including identity creation, authentication, and revocation.

It is another feature of the embodiments that identity can be treated as a profile including a rich set of attributes such as degree, driver license, etc. It is a feature that the invention can include the following parts: (i) identity creation authority, who is responsible for identity creation; (ii) identity owner, who owns and uses the identity produced by the identity creation authority; (iii) identity claim verifier, who verifies whether a claim of identity is valid.

It is yet another feature that that every participant of the decentralized ledger can play the role of identity claim verifier without knowing the concrete identity information and its owner's information. At the same time, the embodiments support complex identity structures and can operate with high performance.

It is yet another feature of the embodiment to provide a identity management system with two useful features: (i) as an independent system, the disclosed embodiments can provide a new application of decentralized ledger with desirable features; (ii) as a component of other decentralized ledger based applications, the disclosed embodiments can provide a critical security service. To ensure data privacy the decryption or access to data by a non-data owner can require joint orchestration of decentralized system nodes to provide partial decryption components with n-of-x required to fulfill request.

It is a feature to provide a method for enabling data access and control in a distributed ledger while maintaining user privacy, that can include steps of receiving an access request at the distributed ledger from a requester to fetch a data file utilizing an identity claim associated with the requester without disclosing the requester's identity, verifying the access request at the decentralized ledger as a legitimate request or as a malicious/faulty request based on verification of the identity claim, and assisting a requester of a legitimate request to access the data and deny access to malicious/faulty requests that are compatible with a decentralized ledger environment.

Embodiments of the invention can also includes the steps that can include providing participants using a distributed ledger system with a public/private key pair, providing identity owners with a pair of claim keys, accomplishing identity claim creation by an identity creation authority using information provided by identity owners, accomplishing identity claim verification of the identity owners by public verifiers; accepting identity claim by identity owners if the identity claim passes a verification algorithm, and submitting a confirmation transaction to the distributed ledger system.

It is also a feature to provide a system for enabling data access and control in a distributed ledger while maintaining user privacy, that can include a decentralized ledger based identity management system, which can include at least one identify creation authority configured to verify whether a certain identity should be issued and prepare an identity message that will be sent to identity verifiers for storage, at least one identify owner configured to obtain identities from identity creation authorities and utilize the identities with identity claim verifiers in a privacy preserving manner, wherein to use the identities, the at least one identity owner creates an identity claim and submits the identity claim to a decentralized ledger for identity claim verifiers to verify, and more than one identity claim verifier configured to: (i) work together to maintain the decentralized ledger as the backbone of a distributed ledger system adapted to store all information, including identities created by authorities and identity claims submitted by identity owners, verify identity claims submitted by identity owners, and determine if an identity claim should be accepted to the decentralized ledger.

In accordance with another aspect of the disclosed method for access control, receive an access request at the distributed ledger to fetch a data file without disclosing requester identity, verify the access request at the decentralized ledger as a legitimate request or as a malicious/faulty request, and assist a user of a legitimate request to access the data and deny access to malicious/faulty requests.

The aforementioned aspects and other objectives and advantages can now be achieved as described herein.

BRIEF DESCRIPTION OF DRAWINGS

The accompanying figures, in which like reference numerals refer to identical or functionally-similar elements throughout the separate views and which are incorporated in and form a part of the specification, further illustrate the embodiments and, together with the detailed description, serve to explain the embodiments disclosed herein.

DETAILED DESCRIPTION

The particular values and configurations discussed in the following non-limiting examples can be varied, and are cited merely to illustrate one or more embodiments and are not intended to limit the scope thereof.

Example embodiments will now be described more fully hereinafter with reference to the accompanying drawings, in which illustrative embodiments are shown. The embodiments disclosed herein can be embodied in many different forms and should not be construed as limited to the embodiments set forth herein; rather, these embodiments are provided so that this disclosure will be thorough and complete, and will fully convey the scope of the embodiments to those skilled in the art Like numbers refer to like elements throughout.

The terminology used herein is for the purpose of describing particular embodiments only and is not intended to be limiting. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

Unless otherwise defined, all terms (including technical and scientific terms) used herein have the same meaning as commonly understood by one of ordinary skill in the art. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

It is contemplated that any embodiment discussed in this specification can be implemented with respect to any method, kit, reagent, or composition of the invention, and vice versa. Furthermore, compositions of the invention can be used to achieve methods of the invention.

It will be understood that particular embodiments described herein are shown by way of illustration and not as limitations of the invention. The principal features of this invention can be employed in various embodiments without departing from the scope of the invention. Those skilled in the art will recognize, or be able to ascertain using no more than routine experimentation, numerous equivalents to the specific procedures described herein. Such equivalents are considered to be within the scope of this invention and are covered by the claims.

The use of the word "a" or "an" when used in conjunction with the term "comprising" in the claims and/or the specification may mean "one," but it is also consistent with the meaning of "one or more," "at least one," and "one or more than one." The use of the term "or" in the claims is used to mean "and/or" unless explicitly indicated to refer to alternatives only or the alternatives are mutually exclusive, although the disclosure supports a definition that refers to only alternatives and "and/or." Throughout this application, the term "about" is used to indicate that a value includes the inherent variation of error for the device, the method being employed to determine the value, or the variation that exists among the study subjects.

As used in this specification and claim(s), the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, un-recited elements or method steps.

The term "or combinations thereof" as used herein refers to all permutations and combinations of the listed items preceding the term. For example, "A, B, C, or combinations thereof" is intended to include at least one of: A, B, C, AB, AC, BC, or ABC, and if order is important in a particular context, also BA, CA, CB, CBA, BCA, ACB, BAC, or CAB. Continuing with this example, expressly included are combinations that contain repeats of one or more item or term, such as BB, AAA, AB, BBC, AAABCCCC, CBBAAA, CABABB, and so forth. The skilled artisan will understand that typically there is no limit on the number of items or terms in any combination, unless otherwise apparent from the context.

All of the compositions and/or methods disclosed and claimed herein can be made and executed without undue experimentation in light of the present disclosure. While the compositions and methods of this invention have been described in terms of preferred embodiments, it will be apparent to those of skill in the art that variations may be applied to the compositions and/or methods and in the steps or in the sequence of steps of the method described herein without departing from the concept, spirit and scope of the invention. All such similar substitutes and modifications apparent to those skilled in the art are deemed to be within the spirit, scope and concept of the invention as defined by the appended claims.

Figure 1:
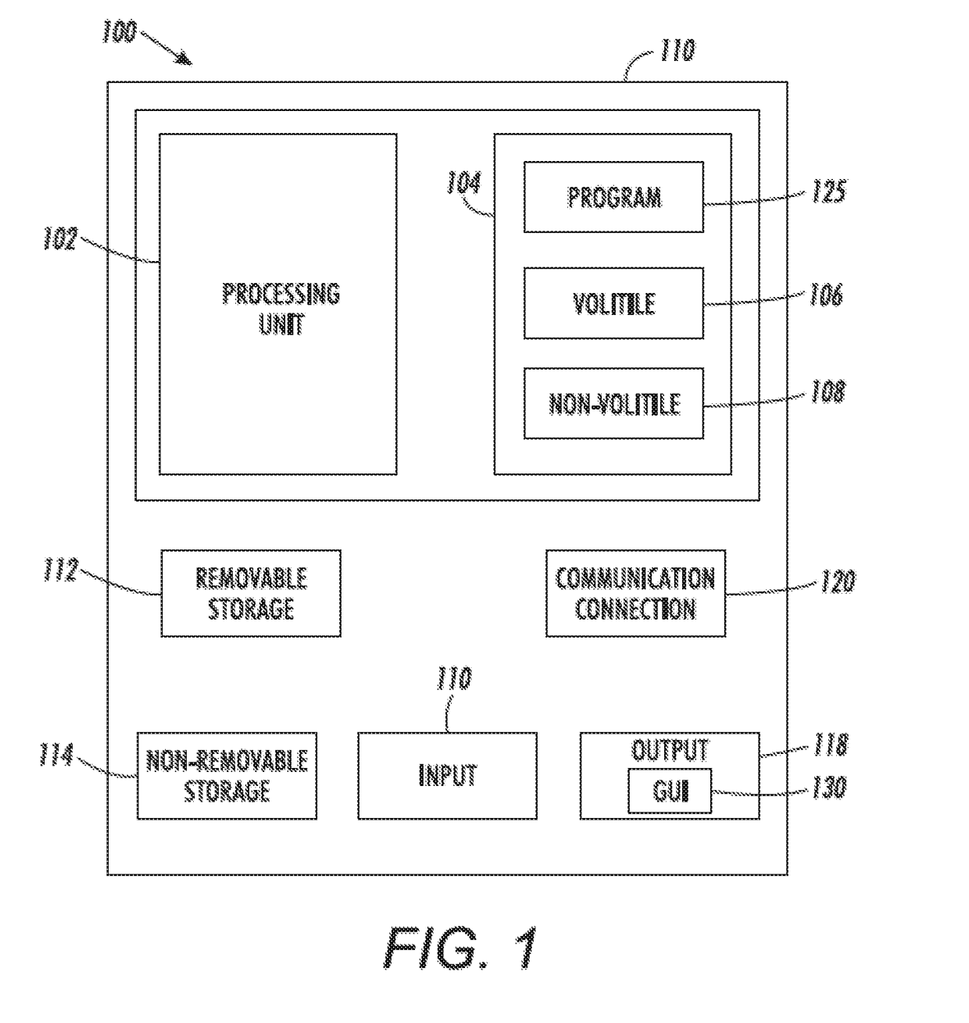
FIGS. 1-3 illustrate data processing and networking environments in which embodiments may be implemented.
Figure 2:
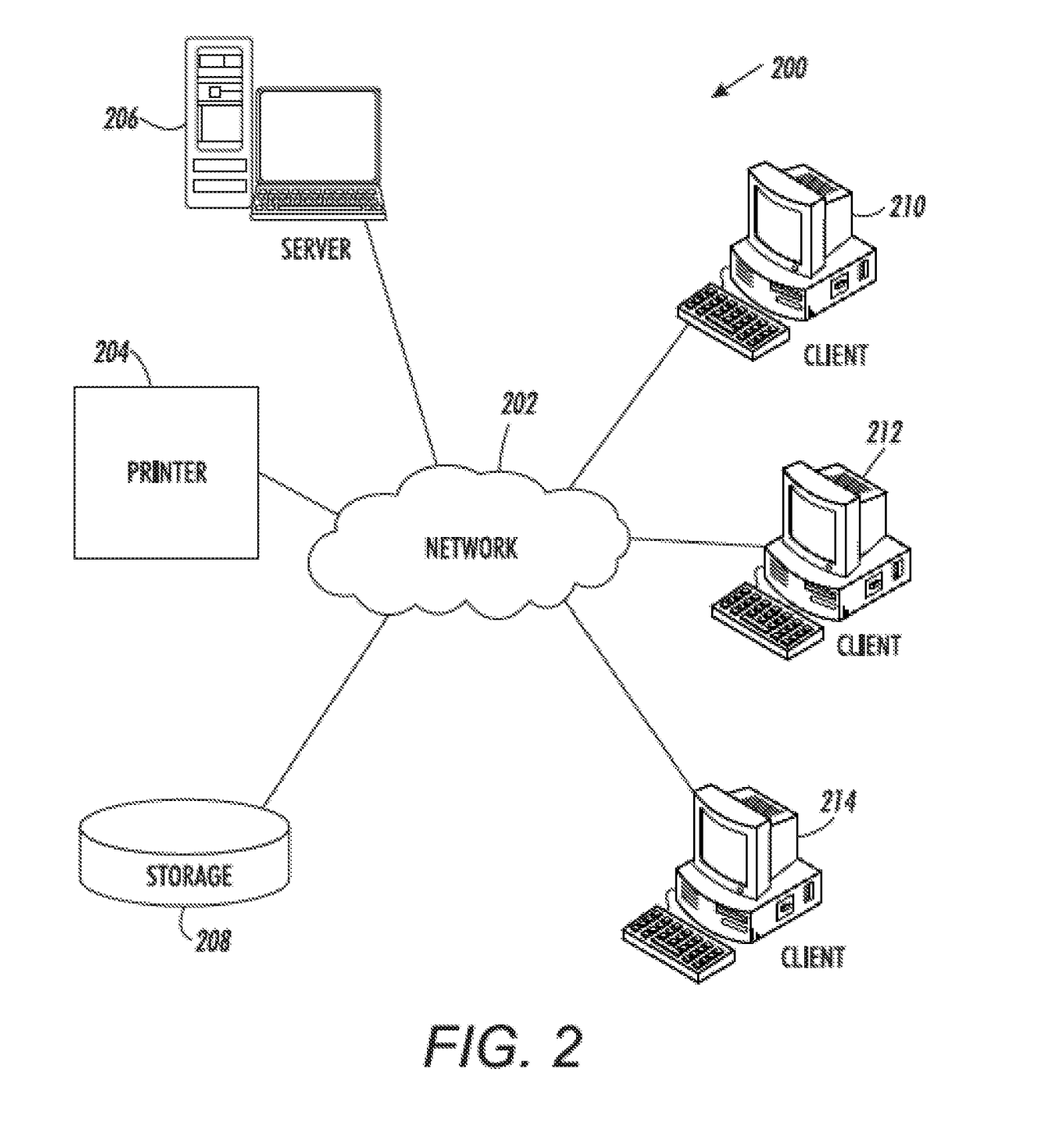
Figure 3:
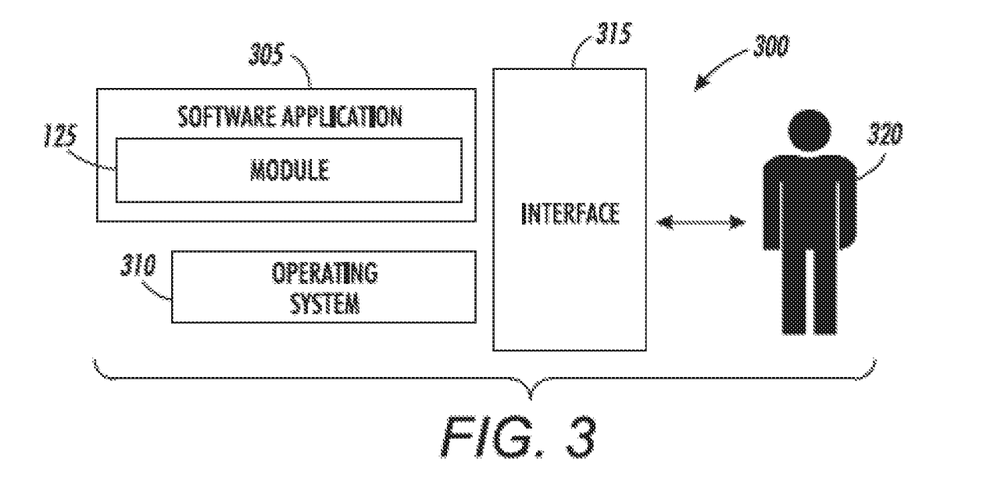

FIGS. 1-3 are provided as exemplary diagrams of data processing and networking environments in which embodiments of the present invention may be implemented. It should be appreciated that FIGS. 1-3 are only exemplary and are not intended to assert or imply any limitation with regard to the environments in which aspects or embodiments of the disclosed embodiments may be implemented. Many modifications to the depicted environments may be made without departing from the spirit and scope of the disclosed embodiments.

A block diagram of a computer system 100 that can execute programming for implementing parts of the methods and systems disclosed herein is shown in FIG. 1. A computing device in the form of a computer 110 configured to interface with controllers, peripheral devices, and other elements disclosed herein can include one or more processing units 102, memory 104, removable storage 112, and non-removable storage 114. Memory 104 can include volatile memory 106 and non-volatile memory 108. Computer 110 can include or have access to a computing environment that includes a variety of transitory and non-transitory computer-readable media such as volatile memory 106 and non-volatile memory 108, removable storage 112 and non-removable storage 114. Computer storage as described herein can include, for example, disc storage, disk storage, random access memory (RAM), read only memory (ROM), erasable programmable read-only memory (EPROM) and electrically erasable programmable read-only memory (EE-PROM), flash memory or other memory technologies, compact disc read-only memory (CD ROM), Digital Versatile Discs (DVD) or other optical disc storage, magnetic cassettes, magnetic tape, magnetic disk storage, or other magnetic storage devices, or any other medium capable of storing computer-readable instructions as well as data including image data.

Computer 110 can include, or have access to, a computing environment that includes input 116, output 118, and a communication connection 120. The computer can operate in a networked environment using a communication connection 120 to connect to one or more remote computers, remote sensors and/or controllers, detection devices, handheld devices, multi-function devices (MFDs), speakers, mobile devices, tablet devices, mobile phones, Smartphone, or other such devices. The remote computer can also include a personal computer (PC), server, router, network PC, RFID enabled device, a peer device or other common network node, or the like. The communication connection 120 may include a Local Area Network (LAN), a Wide Area Network (WAN), Bluetooth connection, or other networks. This functionality is described more fully in the description associated with FIG. 2 below.

Output 118 is most commonly provided as a computer monitor, but can include any output device. Output 118 and/or input 116 can include a data collection apparatus associated with computer system 100. In addition, input 116, which commonly includes a computer keyboard and/or pointing device such as a computer mouse, computer track pad, or the like, allows a user to select and instruct computer system 100. A user interface can be provided using output 118 and input 116. Output 118 can function as a display for displaying data and information for a user, and for interactively displaying a graphical user interface (GUI) 130.

Note that the term "GUI" generally refers to a type of environment that represents programs, files, options, and so forth by means of graphically displayed icons, menus, and dialog boxes on a computer monitor screen. A user can interact with the GUI to select and activate such options by directly touching the screen and/or pointing and clicking with a user input device, such as input 116 which can be embodied, for example, as a pointing device such as a mouse, and/or with a keyboard. A particular item can function in the same manner to the user in all applications because the GUI provides standard software routines (e.g., module 125) to handle these elements and report the user's actions. The GUI can further be used to display the electronic service image frames as discussed below.

Computer-readable instructions, for example, program module or node 125, which can be representative of other modules or nodes described herein, can be stored on a computer-readable medium and can be executable by the processing unit 102 of computer 110. Program module or node 125 can include a computer application to carry out (execute) processes of accessing and managing a decentralized ledger based access control system to include any of accessing, storing and manipulating data. A hard drive, CD-ROM, RAM, Flash Memory, and a USB drive are just some examples of articles including a computer-readable medium.

FIG. 2 depicts a graphical representation of a network of data-processing systems 200 in which aspects of the present invention can be implemented. A network of data-processing system 200 can be a network of computers or other such devices, such as mobile phones, smart phones, wearable computer such as computer-enabled goggles and glasses, sensors, controllers, speakers, tactile devices, and the like, in which embodiments of the present invention can be implemented. Note that the system data-processing system 200 can be implemented in the context of a software module, such as module 125. The data-processing system 200 includes a network 202 in communication with one or more clients 210, 212, and 214. Network 202 can also be in communication with one or more printing devices 204, servers 206, and storage 208. Network 202 is a medium that can be used to provide communications links between various devices and computers connected together within a networked data processing system such as computer system 100, as well as distributed ledger-based systems. Network 202 can include connections such as wired communication links, wireless communication links of various types, and fiber optic cables. Network 202 can communicate with one or more servers 206, one or more external devices such as multifunction device or printer 204, and storage 208, such as a memory storage unit, for example, a memory or database. It should be understood that printing device 204 may be embodied as a printer, copier, fax machine, scanner, multifunction device, rendering machine, photo-copying machine, or other such rendering device.

In the depicted example, printer 204, server 206, and clients 210, 212, and 214 connect to network 202 along with storage 208. Clients 210, 212, and 214 may be, for example, personal computers or network computers, handheld devices, mobile devices, tablet devices, smart phones, personal digital assistants, wearable computers including head-mounted displays such as goggles and glasses, printing devices, recording devices, speakers, MFDs, etc. Computer system 100 depicted in FIG. 1 can be, for example, a client such as client 210 and/or 212 and/or 214.

Computer system 100 can also be implemented as a server such as server 206, depending upon design considerations. In the depicted example, server 206 provides data such as boot files, operating system images, applications, and application updates to clients 210, 212, and/or 214. Clients 210, 212, and 214 and printing device 204 are clients to server 206 in this example. Network data-processing system 200 can include additional servers, clients, and other devices not shown. Specifically, clients can connect to any member of a network of servers, which provide equivalent content.

In the depicted example, the network data-processing system 200 is the Internet, with network 202 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers consisting of thousands of commercial, government, educational, and other computer systems that route data and messages. Of course, network data-processing system 200 can also be implemented as a number of different types of networks such as, for example, an intranet, a local area network (LAN), or a wide area network (WAN). FIGS. 1 and 2 are intended as examples and not as architectural limitations for different embodiments of the present invention.

FIG. 3 illustrates a software system 300, which can be employed for directing the operation of the data-processing systems such as computer system 100 depicted in FIG. 1. Software application 305, can be stored in memory 104, on removable storage 112, or on non-removable storage 114 shown in FIG. 1, and generally includes and/or is associated with a kernel or operating system 310 and a shell or interface 315. One or more application programs, such as module(s) or node(s) 125, may be "loaded" (i.e., transferred from removable storage 114 into the memory 104) for execution by the computer system 100. The computer system 100 can receive user commands and data through interface 315, which can include input 116 and output 118, accessible by a user 320. These inputs may then be acted upon by the computer system 100 in accordance with instructions from operating system 310 and/or software application 305 and any software module(s) 125 thereof.

Generally, program modules (e.g., module 125) can include, but are not limited to, routines, subroutines, software applications, programs, objects, components, data structures, etc., that perform particular tasks or implement particular abstract data types and instructions. Moreover, those skilled in the art will appreciate that elements of the disclosed methods and systems may be practiced with other computer system configurations such as, for example, handheld devices, mobile phones, smart phones, tablet devices multi-processor systems, microcontrollers, printers, copiers, fax machines, multi-function devices, data networks, microprocessor-based or programmable consumer electronics, networked personal computers, minicomputers, mainframe computers, servers, medical equipment, medical devices, and the like.

Note that the term "module" or "node" as utilized herein can refer to a collection of routines and data structures that perform a particular task or implement a particular abstract data type. Modules can be composed of two parts: an interface, which lists the constants, data types, variables, and routines that can be accessed by other modules or routines; and an implementation, which is typically private (accessible only to that module) and which includes source code that actually implements the routines in the module. The term module can also simply refer to an application such as a computer program designed to assist in the performance of a specific task such as word processing, accounting, inventory management, etc., or a hardware component designed to equivalently assist in the performance of a task.

The interface 315 (e.g., a graphical user interface 130) can serve to display results, whereupon a user 320 may supply additional inputs or terminate a particular session. In some embodiments, operating system 310 and GUI 130 can be implemented in the context of a "windows" type system, such as Microsoft Windows®. It can be appreciated, of course, that other types of systems are possible. For example, rather than a traditional "windows" system, other operation systems such as, for example, a real-time operating system (RTOS) more commonly employed in wireless systems may also be employed with respect to operating system 310 and interface 315. The software application 305 can include, for example, module(s) 125, which can include instructions for carrying out steps or logical operations such as those shown and described herein.

The following description is presented with respect to embodiments of the present invention, which can be embodied in the context of, or require the use of, a data-processing system such as computer system 100, in conjunction with program module 125, and data-processing system 200 and network 202 depicted in FIGS. 1-3. The present invention, however, is not limited to any particular application or any particular environment. Instead, those skilled in the art will find that the system and method of the present invention may be advantageously applied to a variety of system and application software including database management systems, word processors, and the like. Moreover, the present invention may be embodied on a variety of different platforms including Windows, Macintosh, UNIX, LINUX, Android, Arduino and the like. Therefore, the descriptions of the exemplary embodiments, which follow, are for purposes of illustration and not considered a limitation.

Figure 4:
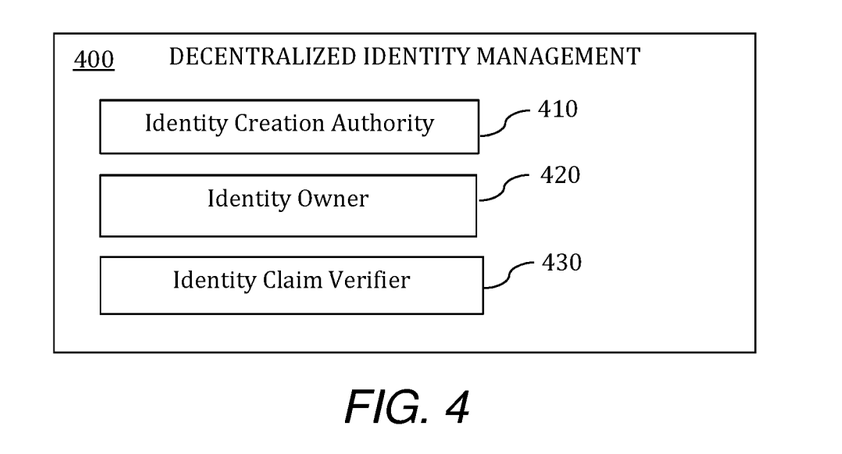
FIG. 4 illustrates a block diagram of components for a decentralized ledger based identity management system, in accordance with the embodiments.
Figure 5:
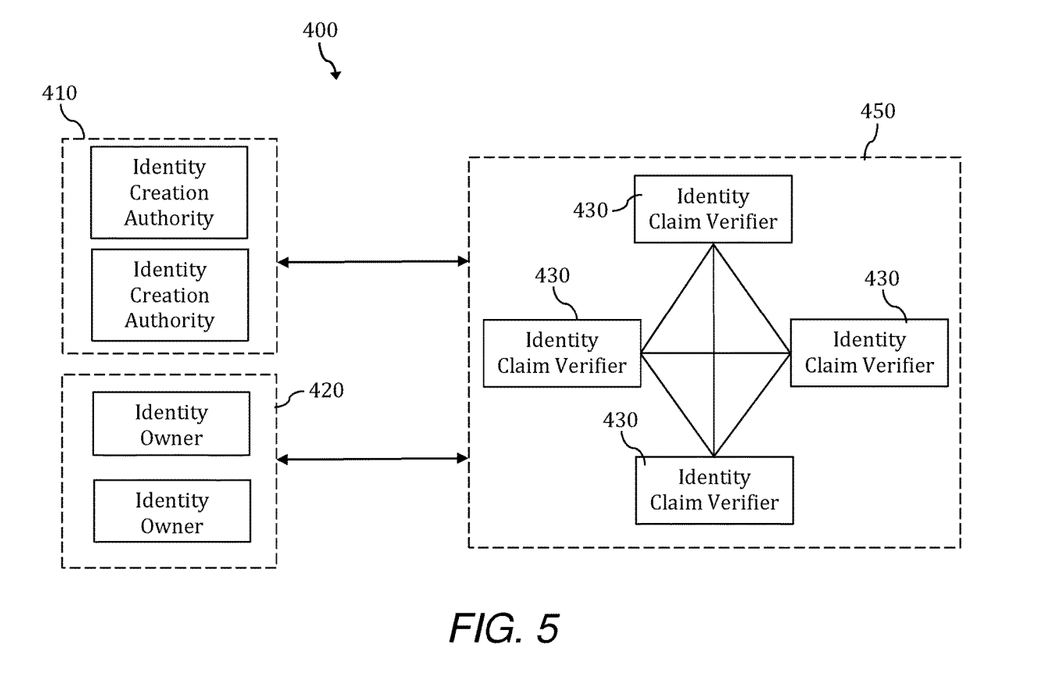
FIG. 5 illustrates a block diagram of components for a decentralized ledger based identity management system, in accordance with the embodiments.

Referring to FIGS. 4-5, block diagrams providing an overview of components of a decentralized ledger based identity management system 400 are illustrated. Referring to FIG. 4, a decentralized ledger based identity management system 400 can include an identify creation authority 410, an identify owner 420, and an identity claim verifier 430. Referring to FIG. 5, with respect to an identity creation authority 410, there can be multiple identity creation authorities in a system. An identity creation authority can verify whether a certain identity should be issued and prepare the identity message that will be sent to identity verifiers to store. An identity owner 420 can obtain identities from identity creation authorities 410 and uses them with identity claim verifiers 430 in a privacy preserving way. More specifically, to use an identity, the identity owner 420 can create a claim and submits to the decentralized ledger 450 for identity verifiers 430 to verify. Identity claim verifiers 430 can have several functionalities: (i) They can work together to maintain the decentralized ledger as the backbone of the system that stores all information, including identities created by authorities and identity claims submitted by identity owners. (ii) Each identity claim verifier 430 can verify claims submitted by identity owners 420, and all identity claim verifiers 430 can work together to determine if a claim should be accepted to the decentralized ledger 450.

Figure 6:
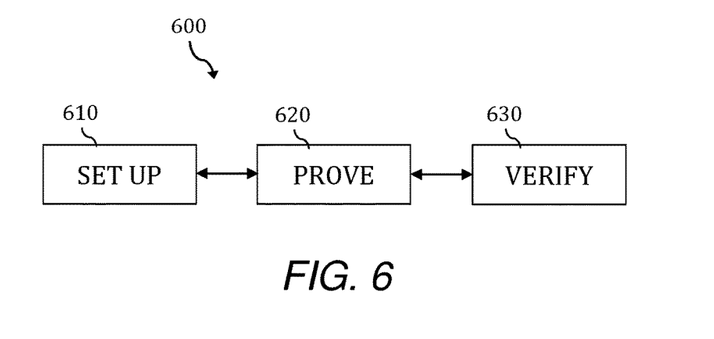
FIG. 6 illustrates a flow diagram of a working procedure for a decentralized ledger based identity management system, in accordance with the embodiments.

Referring to FIG. 6, illustrated is a flow diagram 600 of a working procedure for a decentralized ledger based identity management system. There can be three key steps in the working procedure. The invention can leverage non-interactive zero-knowledge proof technology. Roughly speaking, a zero-knowledge scheme consists of three algorithms, Setup, Prove, and Verify. As shown in Block 610, the Setup algorithm can generate all public parameters. As shown in Block 620, the Prove algorithm can generate a proof for a statement. Then, as shown in Block 630, the Verify algorithm can verify whether a proof is valid. It has been proved that for all NP languages, one can build a zero-knowledge scheme.

Figure 7:
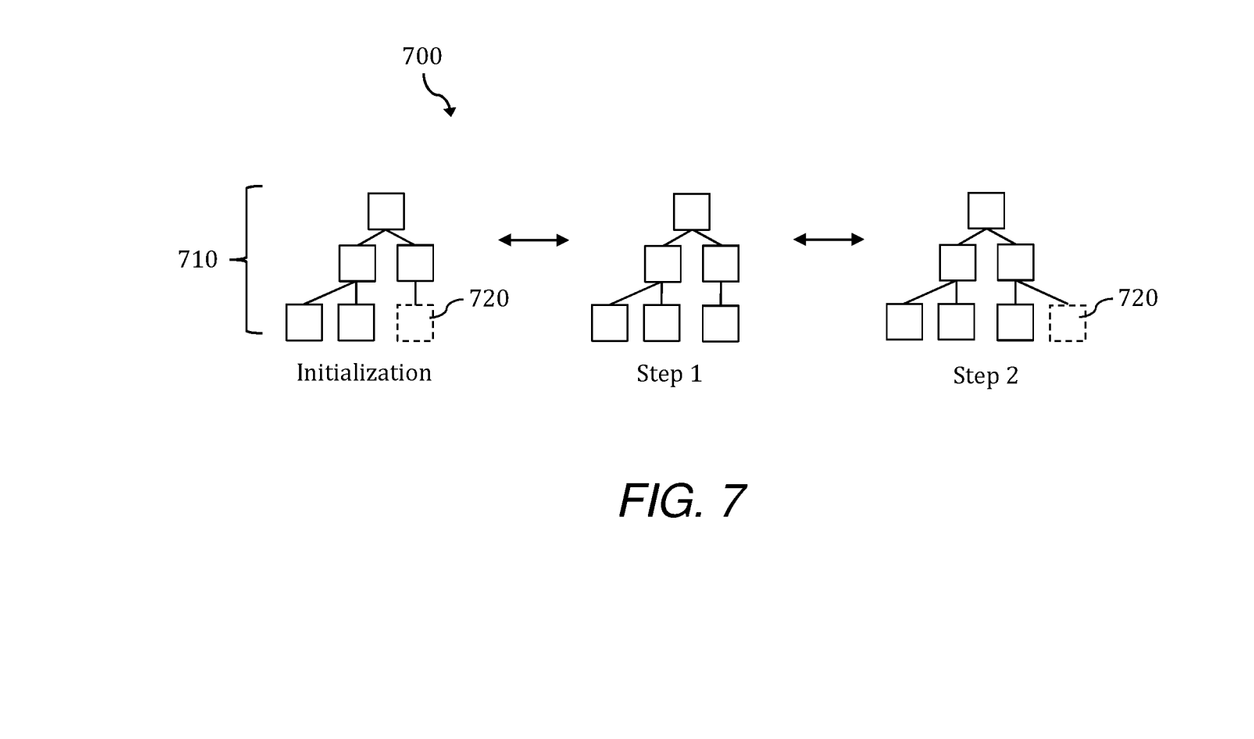
FIG. 7 illustrates a high level working procedure of privacy preserving identity management in a decentralized ledger environment, in accordance with the embodiments.

Referring to FIG. 7, illustrated is a high level working procedure 700 of privacy preserving identity management in a decentralized ledger environment. The decentralized ledger based identity management system can utilize Groth's non-interactive zero-knowledge scheme that is based on bilinear map. The dotted boxes representing leafs 720 are newly added to the Merkle tree 710, which can also represent a decentralized ledger. At system initialization, a user can ads a piece of identity information in the form of a leaf 720 to the Merkle tree 710. Note that the by observing the newly added leaf 720 to the tree 710, one cannot learn information about its creator, and the leaf 720 itself does not leak any identity information. In Step 1, during identity creation, the identity owner does not disclose which leaf he/she is using, yet an identity claim can be achieved with the help of zero-knowledge proof. In Step 2, when reclaiming the identity, zero-knowledge can be used to show ownership of the identity.

Figure 8:
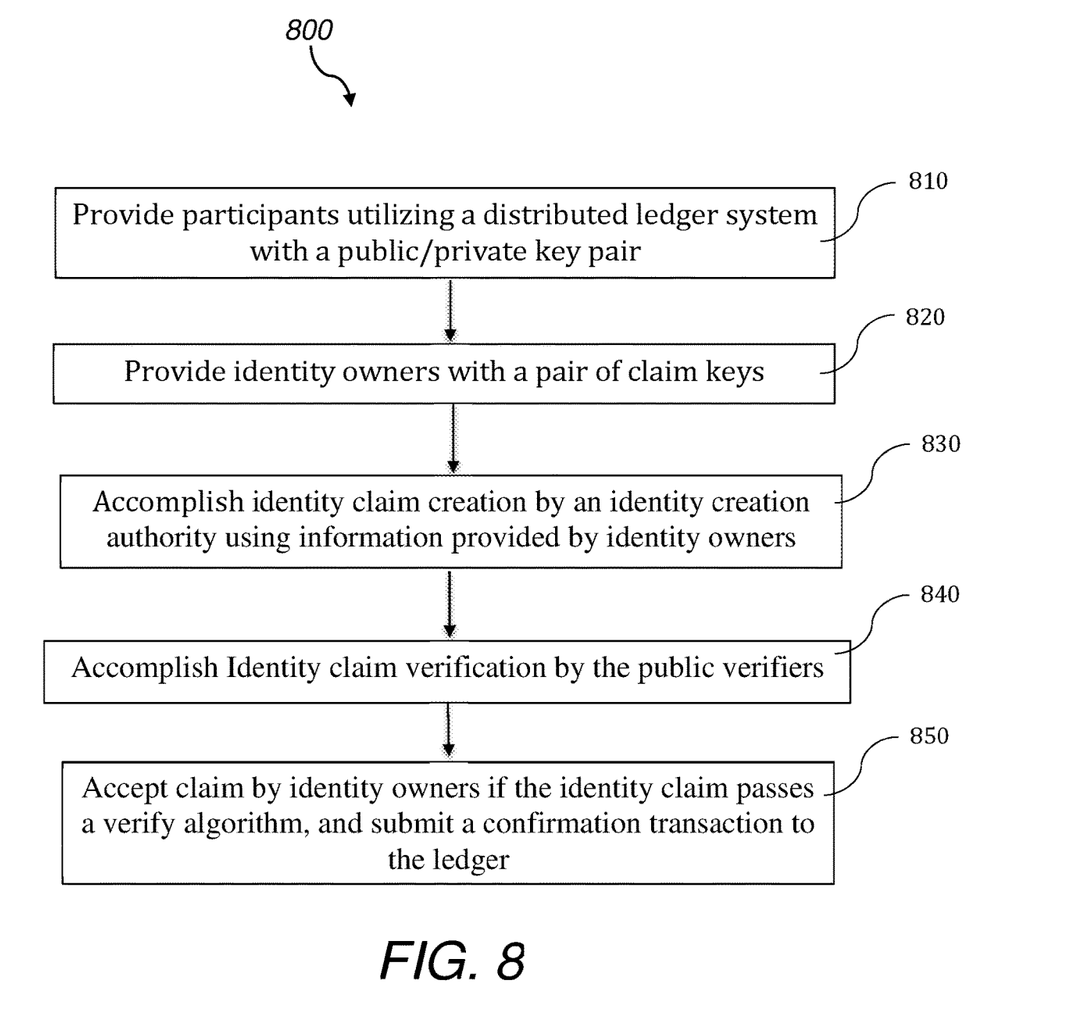
FIG. 8 illustrates a flow diagram of method steps that can be carried out during system initialization, in accordance with the embodiments.

Referring to FIG. 8, a flow diagram 800 illustrating steps during system initialization, in accordance with the embodiments. During System initialization each participant in the system can be equipped with a public/private key pair as shown in Block 810, where the public key can be in the form of a certificate, denoted as $(pk_{id}, sk_{id})$. Furthermore, as shown in Block 820, each identity owner can also have a pair of claim keys $(pk_{owner}^{claim}, sk_{owner}^{claim})$, where $sk_{owner}^{claim}$ can be randomly selected by the identity owner, and $pk_{owner}^{claim} \leftarrow PRF^{claim}(sk_{owner}^{claim}, 0)$, where $PRF^{claim}()$ is a pseudorandom function. As shown in Block 830, identity creation can be accomplished by an identity creation authority. Identity claim verification can then be accomplished by the public, as shown in Block 840. If the claim passes a verify algorithm, the claim will be accepted, and a confirmation transaction can be submitted to the ledger, as shown in Block 850, which finishes the verification of the identity.

Figure 9:
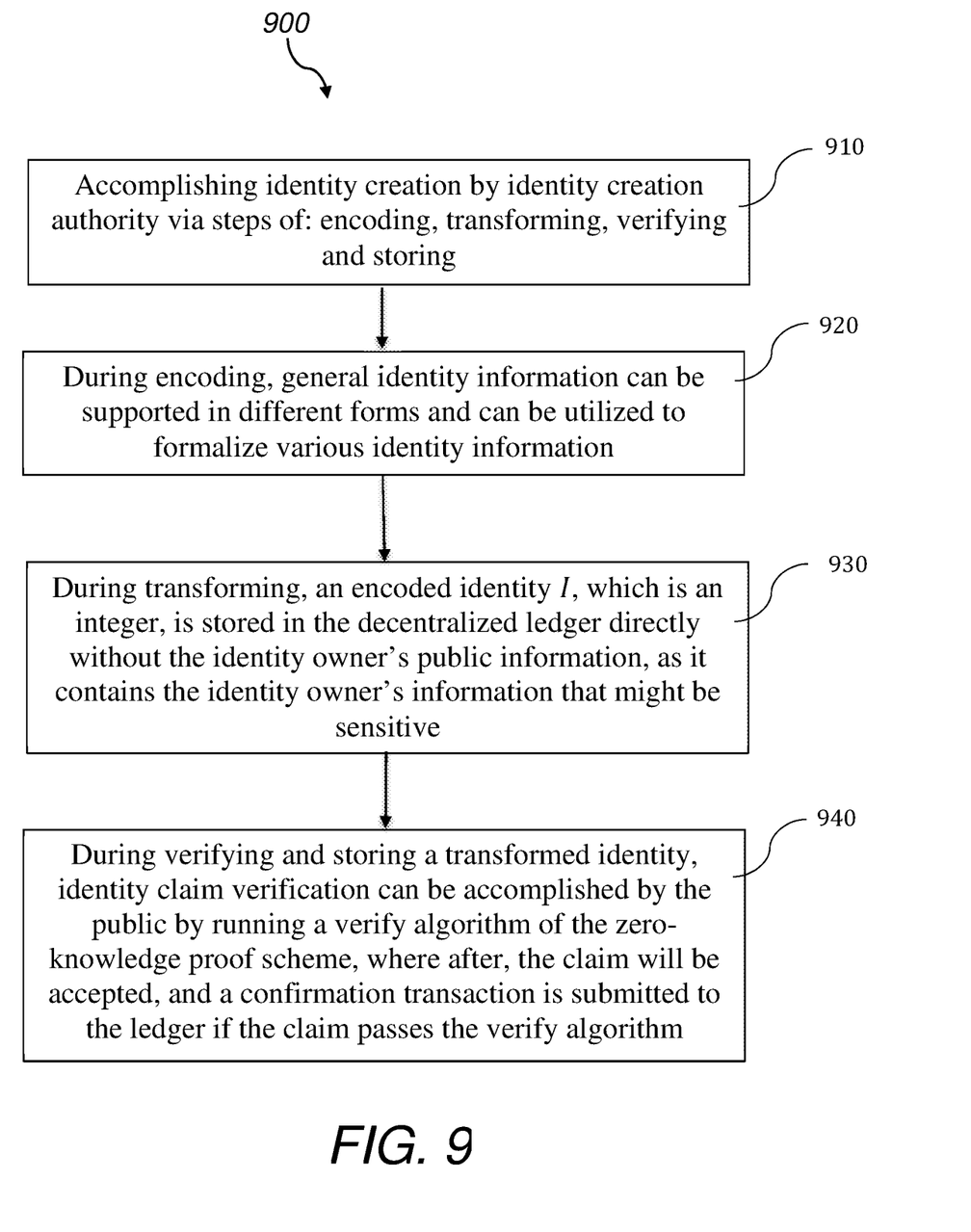
FIG. 9 illustrates a flow diagram for steps that can be carried out in association with identity creation, in accordance with the embodiments.

Referring to FIG. 9, a flow diagram 900 for steps associated with identity creation is illustrated, in accordance with the embodiments. Identity creation can be accomplished by identity creation authority, and can be further divided into three steps: encoding 910, transforming 920, verifying and storing 930. During the encoding 910 step, general identity information can be supported in different forms. Therefore, the encoding step 910 can be utilized to formalize various identity information. To achieve this goal and facilitate following operations, all identity information can be converted to integers. Specifically, each identity can be divided into two fields, one for the type of the identity, and one for the value of the identity. For example, if a 64 bits unsigned integer is used as an encoded identity, 32 bits can be allocated for type information, and 32 bits can be allocated for value information. This can provides a space of $2^{64}$ for all identities. If required, a larger integer structure can be used to support larger identity information space. It should be noted that the encoding process is reversible.

During a transforming step 920, the encoded identity I, which is an integer, can be stored in the decentralized ledger but is not stored in the decentralized ledger directly with the identity owner's public information, as it contains the identity owner's information that might be sensitive. The identity creation authority can further transform the encoded identity I as follows: a) The identity creation authority selects a random value ρ, and we set the serial number of the identity as sn ← $PRF^{sn}(sk_{owner}^{claim}, \rho)$. Note that only the identity owner can calculate sn; b) The identity creation authority calculates k ← $COMM(r, pk_{owner}^{claim} \| \rho$, and cm ← COMM (s,I‖k), where COMM(•,•) is a commitment scheme and r, s are randomly selected values for the commitment scheme; c) The final format of transformed I is $tx_I \leftarrow ((I, k, s, cm), sig_{creator}^{tx_I})$, where $sig_{creator}^{tx_I}$ is a digital signature on (I, k, s) generated by the identity creation authority using its private key.

When verifying and storing 930 a transformed identity, identity claim verification can be accomplished by the public by running a verify algorithm of the zero-knowledge proof scheme, where after, the claim will be accepted, and a confirmation transaction is submitted to the ledger if the claim passes the verify algorithm. A naive approach to store transformed identity to the decentralized ledger is embedding it to a block directly and linking it to the ledger. However, this can cause performance information for later operations as the complexity of the claim verification will grow as the decentralized ledger becomes longer. Therefore, cm can be organized as a Merkle tree with fixed height, and the root can be demoted as rt. With a relatively small height, such as 32, the system can support a large number of transactions. It should be noted that that this step does not leak the identity owner's information as no one could establish the connection between the owner and I.

Figure 10:
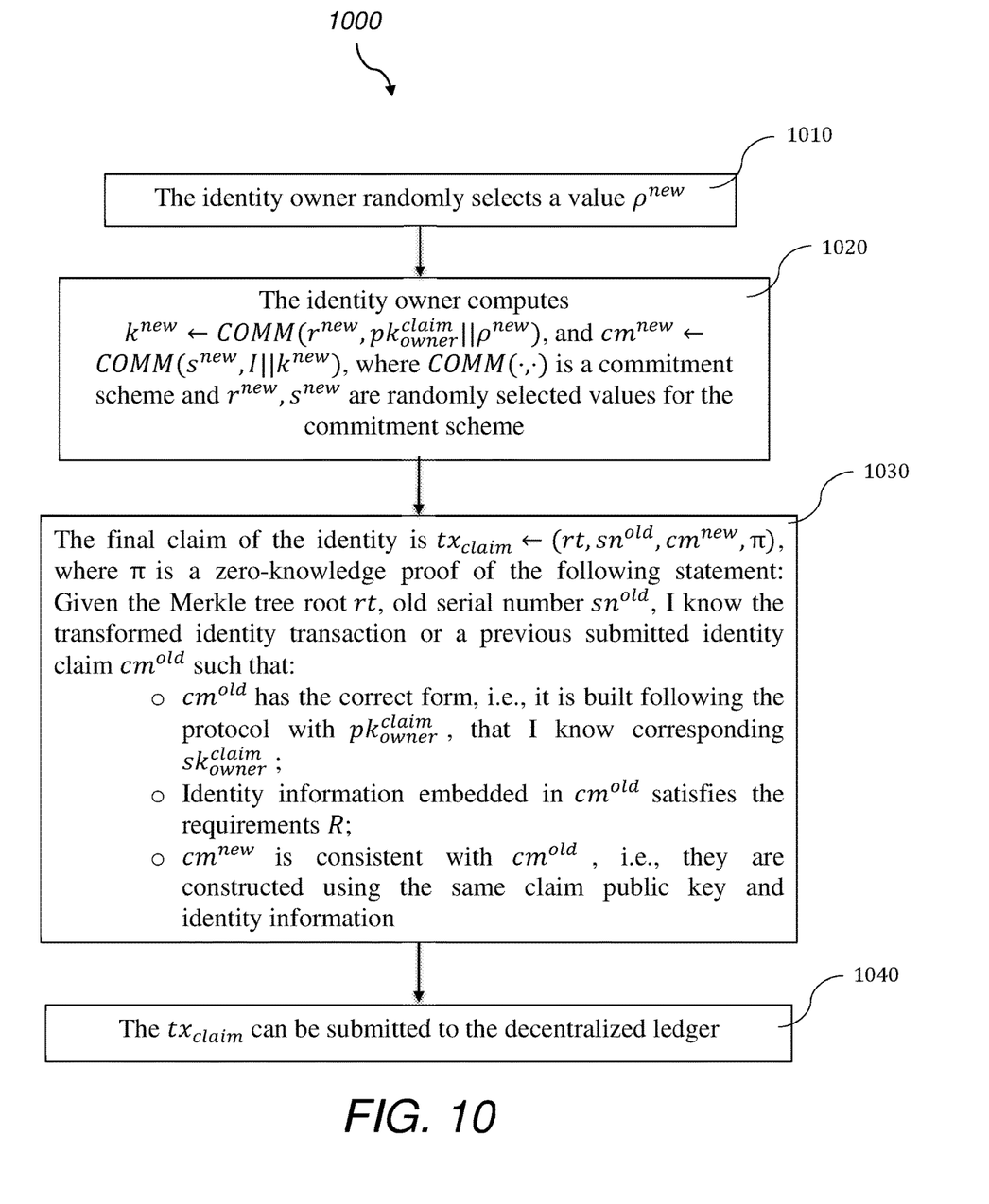
FIG. 10 illustrates a flow diagram of method steps that can be carried out steps for identity claim construction, in accordance with the embodiments.

Referring to FIG. 10, a flow diagram 1000 of steps for identity claim construction is illustrated, in accordance with features of the embodiments. The creation of an identity claim for requirements R is by nature to generate a zero-knowledge proof to demonstrate that the proof creator, i.e., the identity owner, owns a certain identity. One important requirement is that the proof is one-time, i.e., if the identity owner creates two proofs for the same identity information, no one can connect these two proofs. The identity owner builds the identity claim as follows. Referring to Block 1010, the identity owner randomly selects a value $\rho^{new}$. Referring to Block 1020, the identity owner computes $k^{new} \leftarrow COMM(r^{new}, pk_{owner}^{claim} \| \rho^{new})$ and $cm^{new} \leftarrow COMM(s^{new}, I \| k^{new})$ where COMM(•,•) is a commitment scheme and $r^{new}, s^{new}$ are randomly selected values for the commitment scheme. Referring to Block 1030, the final claim of the identity is $tx_{claim} \leftarrow (rt, sn^{old}, cm^{new}, \pi)$ where π is a zero-knowledge proof of the following statement: Given the Merkle tree root rt, old serial number $sn^{old}$, I know the transformed identity transaction or a previous submitted identity claim $cm^{old}$ such that:

$cm^{old}$ has the correct form, i.e., it is built following the protocol with $pk_{owner}^{claim}$, that I know corresponding $sk_{owner}^{claim}$;

Identity information embedded in $cm^{old}$ satisfies the requirements R;

$cm^{new}$ is consistent with $cm^{old}$, i.e., they are constructed using the same claim public key and identity information.

Then, as shown in Block 1040, the $tx_{claim}$ can be submitted to the decentralized ledger.

Identity claim verification. As previously mentioned with respect to the flow diagram in FIG. 8, identity claim verification can be accomplished by the public by running a verify algorithm of the zero-knowledge proof scheme. If the claim passes the verify algorithm, the claim will be accepted, and a confirmation transaction is submitted to the ledger, which finishes the verification of the identity.

Self-consistency claim verification. A specialized subcomponent of the claim verification scheme is the ability to have self-consistent checks for claims that have dependencies between them. For example, a medical doctor that needs to prove he is board certified should also be able to prove that he acquired a medical degree, a bachelor's degree, and that he took the boards exam. These types of dependencies can be aggregated and treated as special self-consistent checks to make verification of false claims more difficult. One method to implement this additional scheme is to have if-else verification constructs that make use of the rich identity information.

Another method to have self-consistency is to have verifying entities also requester of verified information such that the process of verifying combines both the existence of verified information in the siloed verifiers database, but also the existence of pre-requisites in the decentralized system. An example of this embodiment is a state medical board certification agency has been requested by a medical doctor the verification of his/her license. In addition to doing a search of their existing database to match the person's name and record to the boards internal records, the also request that the medical doctor prove that he has attained a medical degree and a bachelor's degree from accredited universities. This implementation maintains self-consistent records and further augments the user's identity to make a more complete profile.

Obfuscating user activity for enhanced privacy. An added novel component of this system is an in-built noise transaction generator to make user recognition more difficult when system has low transactions volumes. One potential vulnerability of the system is that if there is a low number of users or simply low volume of claim verification or authenticity transactions, an entity that is requesting both verified information and monitoring decentralized ledger activity can find patterns for determining actual user identity, not just whether it exist or not (Remember that the point of using Zero Knowledge Proof is to show that information exist without sharing information). One way to implement this noising system is to have a series of bot accounts that can transact on network during initial setup phase and at time of low transaction volumes. The amount of noising needs to be optimized for system performance and privacy preservation and is mainly expected to be important during the initialization phase until system reaches a minimum critical mass.

To further summarize methods in accordance with the disclosed embodiments, embodiments of the present invention provide a novel way to support identity information verification in the decentralized environment, which can be integrated with different applications based on decentralized ledger technology. In summary, it has the following benefits: It can protect the privacy of the identity owner. In order for the identity owner to show that he/she satisfies certain requirements, he/she does not need to explicitly disclose his/her identity information to the public; it can support multiple time proof. The identity owner can prove the same identity information multiple times, while the verifiers cannot link them; it can support rich identity information. The encoding mechanism and the zero-knowledge proof scheme can support rich identity information, including but not limited to, equivalent test, range test, and comparison.

In accordance with an exemplary application of the embodiments of the present invention, a user of a medical system (i.e., a medical doctor) has undergone process of registering with system and has had multiple identity claims verified including state licenses. The individual credentials have several pieces of information attached to them including issuing authority, expiration date, certificate type, etc. A third party (Insurance company) needs to verify that a doctor is register and licensed with state board and requests that the doctor prove that he is certified to operate. User can use the privacy preserving scheme to show that he is certified and that the information passes several validity test including: 1) Exist=TRUE, 2) Expiration Date>=Todays Date, 3) Name on Certificate=Name of User, etc.

It will be appreciated that variations of the above-disclosed and other features and functions, or alternatives thereof, may be desirably combined into many other different systems or applications. Also, it should be understood that various presently unforeseen or unanticipated alternatives, modifications, variations or improvements therein can be subsequently made by those skilled in the art, which are also intended to be encompassed by the following claims.

What is claimed is:

1. A method for enabling data access and control in a distributed ledger while maintaining user privacy, comprising:

providing participants using a distributed ledger system with a public/private key pair;

providing identity owners with a pair of claim keys, wherein an identity claim of an identity owner among the identity owners is established when the identity owner randomly selects a value $\rho^{new}$, and computes $k^{new} \leftarrow COMM(r^{new}, pk_{owner}^{claim} \| \rho^{new})$ and $cm^{new} \leftarrow COMM(s^{new}, I \| k^{new})$, wherein $COMM(\cdot,\cdot)$ is a commitment scheme and $r^{new}$, $s^{new}$ are randomly selected values for the commitment scheme;

accomplishing identity claim creation by an identity creation authority using information provided by identity owners;

accomplishing identity claim verification of the identity owners by public verifiers; and accepting identity claim by identity owners if the identity claim passes a verification algorithm; and submitting a confirmation transaction to the distributed ledger system.

2. The method of claim 1, wherein a final claim of the identity claim is $tx_{claim} \leftarrow (rt, sn^{old}, cm^{new}, \pi)$, where $\pi$ is a zero-knowledge proof of the following statement: Given the Merkle tree root rt, old serial number $sn^{old}$, I know the transformed identity transaction or a previous submitted identity claim $cm^{old}$ such that:

a. $cm^{old}$ has the correct form, i.e., it is built following the protocol with $pk_{owner}^{claim}$, that I know corresponding $sk_{owner}^{claim}$;
b. identity information embedded in $cm^{old}$ satisfies the requirements R; and
c. $cm^{new}$ is consistent with $cm^{old}$, i.e., they are constructed using the same claim public key and identity information.

3. The method of claim 2, wherein the $tx_{claim}$ is submittable to a decentralized ledger for verification.

4. The method of claim 1 wherein the distributed ledger system comprises a decentralized ledger.

5. The method system of claim 4, wherein the decentralized ledger comprises a Merkle tree.

6. The method of claim 1, wherein the information provided by the identity owners includes the public/private key pair.

7. The method of claim 1, wherein the information provided by identity owners includes claim keys.

8. The method of claim 1, wherein at least one identity owner among the identity owners accomplishes identity claim creation via coordination with the identity creation authority using information provided by the at least one identity owner.

9. A distributed ledger system for enabling data access and control in a distributed ledger while maintaining user privacy, the system comprising:
participants using a distributed ledger system with a public/private key pair, wherein identity owners are provided with a pair of claim keys, an identity claim of an identity owner among the identity owners is established when the identity owner randomly selects a value $\rho^{new}$, and computes $k^{new} \leftarrow COMM(r^{new}, pk_{owner}^{claim}\|\rho^{new})$ and $cm^{new} \leftarrow COMM(s^{new}, I\|k^{new})$, wherein $COMM(\bullet,\bullet)$ is a commitment scheme and $r^{new}$, $s^{new}$ are randomly selected values for the commitment scheme; and
an identity creation authority, wherein identify claim creation is accomplished by the identity creation authority using information provided by identity owners, wherein identity claim verification is accomplished by identity claim verification of the identity owners by public verifiers, wherein identity claim is accepted by the identity owners when the identity claim passes a verification algorithm, and wherein a confirmation transaction is submitted to the distributed ledger system.

10. The system of claim 9, wherein wherein a final claim of the identity claim is $tx_{claim} \leftarrow (rt, sn^{old}, cm^{new}, \pi)$, where $\pi$ is a zero-knowledge proof of the following statement: Given the Merkle tree root rt, old serial number $sn^{old}$, I know the transformed identity transaction or a previous submitted identity claim $cm^{old}$ such that:
a. $cm^{old}$ has the correct form, i.e., it is built following the protocol with $pk_{owner}^{claim}$, that I know corresponding $sk_{owner}^{claim}$;
b. identity information embedded in $cm^{old}$ satisfies the requirements R; and
c. $cm^{new}$ is consistent with $cm^{old}$, i.e., they are constructed using the same claim public key and identity information.

11. The system of claim 10, wherein the $tx_{claim}$ is submittable to a decentralized ledger for verification.

12. The system of claim 9, wherein the distributed ledger system comprises a decentralized ledger.

13. The system of claim 12, wherein the decentralized ledger comprises a Merkle tree.

14. The system of claim 9 wherein the information provided by the identity owners includes the public/private key pair.

15. The system of claim 9, wherein the information provided by identity owners includes claim keys.

16. The system of claim 9, wherein at least one identity owner among the identity owners accomplishes identity claim creation via coordination with the identity creation authority using information provided by the at least one identity owner.

17. A non-transitory computer-readable medium for enabling data access and control in a distributed ledger while maintaining user privacy, the non-transitory computer-readable medium comprising computer-readable instructions recorded thereon for:
providing participants using a distributed ledger system with a public/private key pair;
providing identity owners with a pair of claim keys, wherein an identity claim of an identity owner among the identity owners is established when the identity owner randomly selects a value $\rho^{new}$, and computes $k^{new} \leftarrow COMM(r^{new}, pk_{owner}^{claim}\|\rho^{new})$ and $cm^{new} \leftarrow COMM(s^{new}, I\|k^{new})$ wherein $COMM(\bullet,\bullet)$ is a commitment scheme and $r^{new}$, $s^{new}$ are randomly selected values for the commitment scheme;
accomplishing identity claim creation by an identity creation authority using information provided by identity owners;
accomplishing identity claim verification of the identity owners by public verifiers; and
accepting identity claim by identity owners if the identity claim passes a verification algorithm; and
submitting a confirmation transaction to the distributed ledger system.

18. The non-transitory computer-readable medium of claim 17, wherein a final claim of the identity claim is $tx_{claim} \leftarrow (rt, sn^{old}, cm^{new}, \pi)$, where $\pi$ is a zero-knowledge proof of the following statement: Given the Merkle tree root rt, old serial number $sn^{old}$, I know the transformed identity transaction or a previous submitted identity claim $cm^{old}$ such that:
a. $cm^{old}$ has the correct form, i.e., it is built following the protocol with $pk_{owner}^{claim}$, that I know corresponding $sk_{owner}^{claim}$;
b. identity information embedded in $cm^{old}$ satisfies the requirements R; and
c. $cm^{new}$ is consistent with $cm^{old}$, i.e., they are constructed using the same claim public key and identity information.

19. The non-transitory computer-readable medium of claim 18, wherein the $tx_{claim}$ is submittable to a decentralized ledger for verification.

* * * * *